(12) United States Patent
Debelius

(10) Patent No.: US 6,707,198 B1
(45) Date of Patent: Mar. 16, 2004

(54) ARMATURE SHAFT RETAINER

(75) Inventor: Stephen A. Debelius, Phoenix, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 09/293,455

(22) Filed: Apr. 16, 1999

(51) Int. Cl.[7] ............... H02K 5/16; H02K 5/167
(52) U.S. Cl. ............... 310/90; 310/50; 384/903; 384/295; 384/538
(58) Field of Search ............... 310/90, 50, 258, 310/233, 231; 384/903, 295, 538, 539

(56) References Cited

U.S. PATENT DOCUMENTS

| | | | |
|---|---|---|---|
| 3,441,325 A | 4/1969 | Sjotun | 308/161 |
| 3,624,434 A | * 11/1971 | Dafler | 310/90 |
| 3,663,849 A | 5/1972 | Heob | 310/90 |
| 3,829,722 A | * 8/1974 | Rosenthal, Jr. et al. | 310/90 |
| 4,164,674 A | 8/1979 | Buckman et al. | 310/90 |
| 4,795,926 A | * 1/1989 | Someya et al. | 310/90 |
| 4,801,252 A | * 1/1989 | Wrobel | 417/354 |
| 4,967,111 A | 10/1990 | Andrieux et al. | 310/90 |

FOREIGN PATENT DOCUMENTS

| | | | |
|---|---|---|---|
| DE | 2943711 | A1 | 5/1981 |
| DE | 3115752 | A1 | 11/1982 |
| DE | 3346697 | C2 | 7/1988 |
| DE | 3534381 | C2 | 11/1989 |
| DE | 3830386 | C2 | 6/1991 |
| DE | 4309030 | A1 | 10/1994 |
| DE | 19652929 | A1 | 6/1998 |
| EP | 0065585 | B2 | 5/1981 |
| EP | 0088946 | B1 | 3/1983 |
| EP | 0175798 | B1 | 9/1984 |
| EP | 0213427 | B1 | 8/1986 |
| EP | 0222107 | B1 | 9/1986 |
| EP | 0622886 | A1 | 4/1994 |
| EP | 0703655 | B1 | 9/1994 |
| EP | 0703656 | B1 | 9/1994 |

* cited by examiner

*Primary Examiner*—Karl Tamai
(74) *Attorney, Agent, or Firm*—Harness, Dickey & Pierce, P.L.C.

(57) ABSTRACT

An armature shaft for a motor of a power tool has a shaft with two ends. A commutator is on the shaft. At least one bearing is on the shaft adjacent the commutator end of the shaft. The bearing has a central bore sized to balance the shaft during rotation. Also, a central bore in the bearing has an enlarged diameter portion. A retainer is fixed on the shaft to retain the bearing on the shaft. The retainer is positioned within the enlarged bore portion of the bearing.

21 Claims, 2 Drawing Sheets

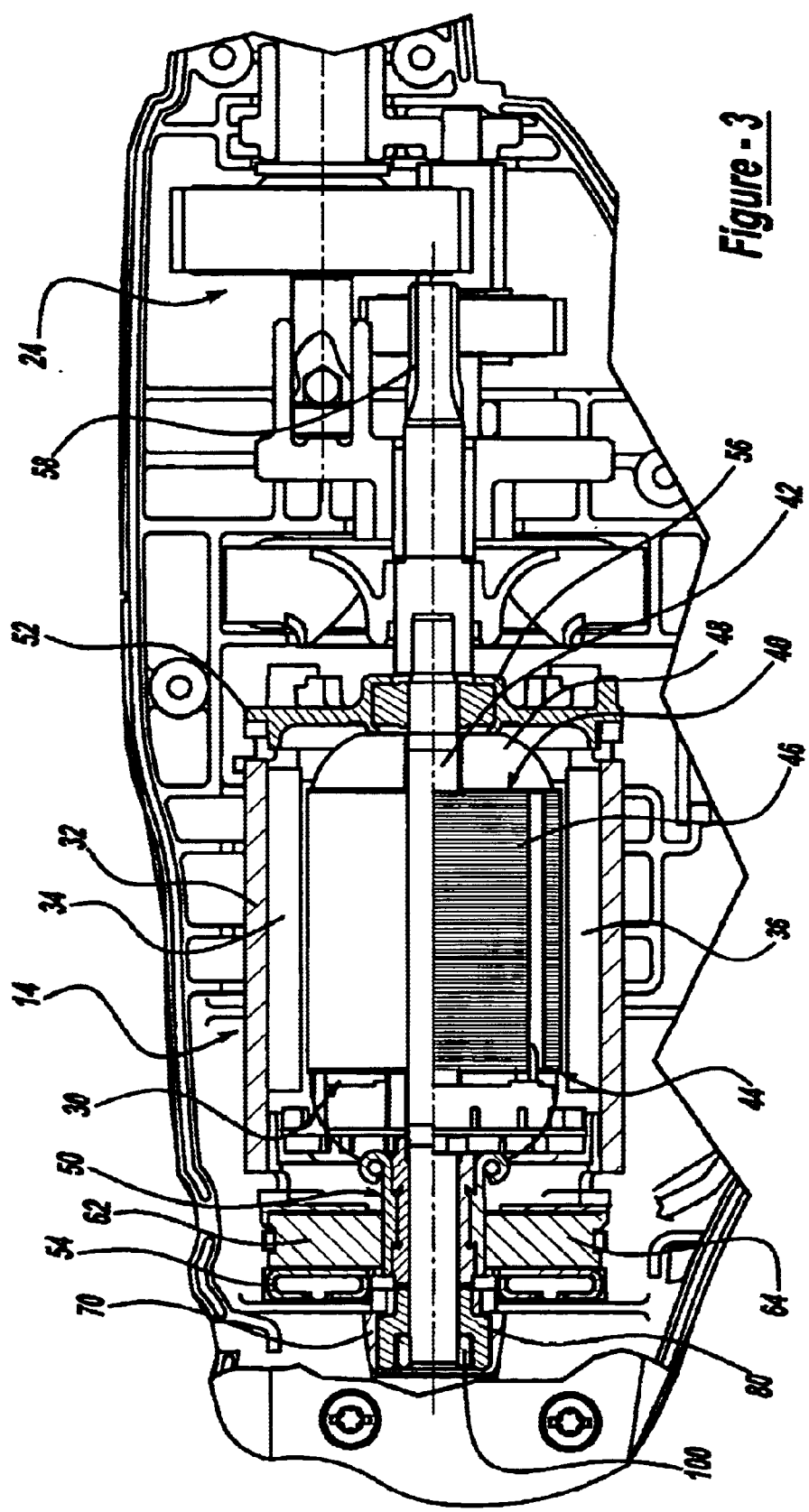

ARMATURE SHAFT RETAINER

BACKGROUND OF THE INVENTION

The present Invention relates to power tool motors and, more particularly, to a retainer which maintains the armature shaft positioned within the stator assembly of the motor.

In manufacturing electric motors, it is important to have proper alignment between the armature, which includes the rotor and commutator, with the brushes and stator assembly. Proper alignment prohibits axial movement or end play which may occur In the motor when the armature shaft is positioned within the motor. Excessive axial shifting is known to cause noise, vibration, and excessive wear during operation. Thus, it is desirable to limit axial movement of the armature shaft in the motor.

In the past, the armature shaft has induded a groove with slip rings, such as C-rings, as well as washers to maintain the axial integrity of the shaft. However, these types of connections have enables more axial play than is desired in the shaft. Thus, it would be desirable to maintain the axial integrity of the armature shaft within the motor. Also, it would be desirable to provide a registration point so that the commutator and rotor could be positioned along the shaft.

Accordingly, it is an object of the present invention to provide a retainer for an armature shaft which maintains the axial integrity of the shaft within the stator assembly of the motor. Also, the present invention provides the art with a retainer which is maintained within a bearing. The retainer and bearing are flush with the end of the armature shaft to provide registration for the armature shaft components. The present invention also provides the art with an inexpensive and efficient device to maintain the armature shaft within the stator assembly.

In accordance with a first aspect of the invention, an armature shaft comprises a shaft which has two ends. A commutator is positioned on the shaft. At least one bearing is on the shaft and is adjacent one of the ends of the shaft. The bearing has a central bore sized to balance the shaft during rotation. The central bore also has an enlarged diameter portion. A retainer is positioned on the shaft to retain the bearing on the shaft. The retainer is positioned within the enlarged bore portion of the bearing. A bearing housing surrounds the bearing and is adapted to fix with an end plate of the motor. The bearing housing has a receiving bore to receive the bearing. The bearing housing has a stepped configuration. The bearing likewise has an outer configuration which is stepped to fit within the housing. The bearing and retaining member are flush with the end of the shaft. Also, the enlarged bore portion defines an abutting shoulder which abuts against an end of the retainer.

In accordance with a second embodiment of the invention, an electric motor comprises a stator assembly with an armature rotatable within the stator assembly. A commutator is rotatable with the armature and is connected to the armature via a shaft. Brushes are associated with the commutator and the brushes are held on an end plate of the motor. At least one bearing is on the shaft and is adjacent one of the ends of the shaft. The bearing has a central bore sized to balance the shaft during rotation. The central bore also has an enlarged diameter portion. A retainer is positioned on the shaft to retain the bearing on the shaft. The retainer is positioned within the enlarged bore portion of the bearing. A bearing housing surrounds the bearing and is fixed to the end plate of the motor. The bearing housing has a receiving bore to receive the bearing. The bearing housing has a stepped configuration. The bearing likewise has an outer configuration which is stepped to fit within the bearing housing. The bearing and retaining member are flush with the end of the shaft. Also, the enlarged bore portion defines an abutting shoulder which shoulder abuts against the retainer. A second bearing is at the other end of the shaft.

In accordance with a third embodiment of the present invention, a power tool comprises a housing. A motor Is positioned within the housing. The motor includes a stator assembly with an armature rotatable within the stator assembly. A commutator is rotatable with the armature and is connected to the armature via a shaft. Brushes are associated with the commutator and the brushes are held on an end plate of the motor. At least one bearing is on the shaft and is adjacent one of the ends of the shaft. The bearing has a central bore sized to balance the shaft during rotation. The central bore also has an enlarged diameter portion. A retainer Is positioned on the shaft to retain the bearing on the shaft. The retainer is positioned within the enlarged bore portion of the bearing. A bearing housing surrounds the bearing and is fixed to the end plate of the motor. The bearing housing has a receiving bore to receive the bearing. The bearing housing has a stepped configuration. The bearing, likewise, has an outer configuration which is stepped to fit within the bearing housing. The bearing and retaining member are flush with the end of the shaft. Also, the enlarged bore portion defines an abutting shoulder which shoulder abuts against the retainer. Also, a power source is electrically coupled with the motor. An activation member is electrically coupled with the motor and the power source to energize and de-energize the motor. An output is coupled with the motor to drive a tool.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

FIG. 3 is an enlarged cross-section view of FIG. 1.

DETAILED DESCRIPTION OF THE PREFERRED EMBODIMENT

Figure 1:
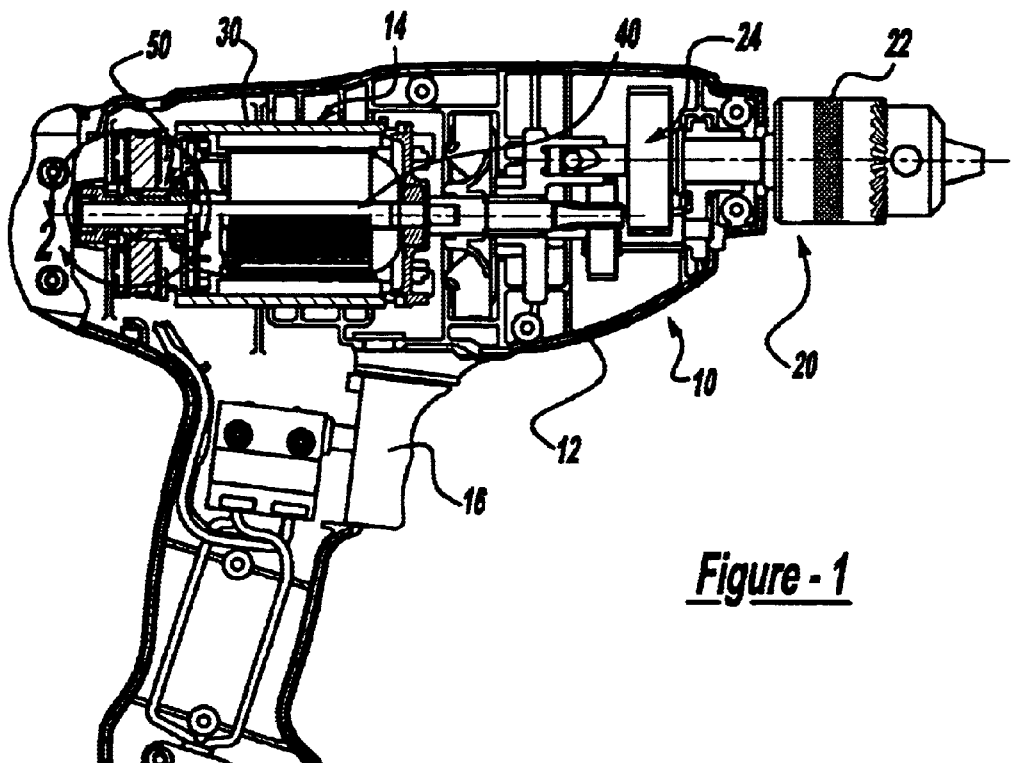
FIG. 1 illustrates a plan view partially in section of a power tool in accordance with the present invention.

Turning to FIG. 1, a power tool in accordance with the present Invention is illustrated and designated with the reference numeral 10. The power tool is Illustrated as a drill; however, any type of power tool such as a screwdriver, sander, rotary tool, dippers, saw or the like which utilize an electrical motor may use the motor of the present invention. The power tool 10 includes a housing 12 which surrounds a motor 14. An activation member 16 is coupled with the motor 14 as well as with a power source 18. The power source 18 may be a battery (DC current) or the power tool may have a power cord (AC current) as shown. The motor 14 is also coupled with an output 20 which may include a chuck 22 and a transmission 24.

Figure 2:
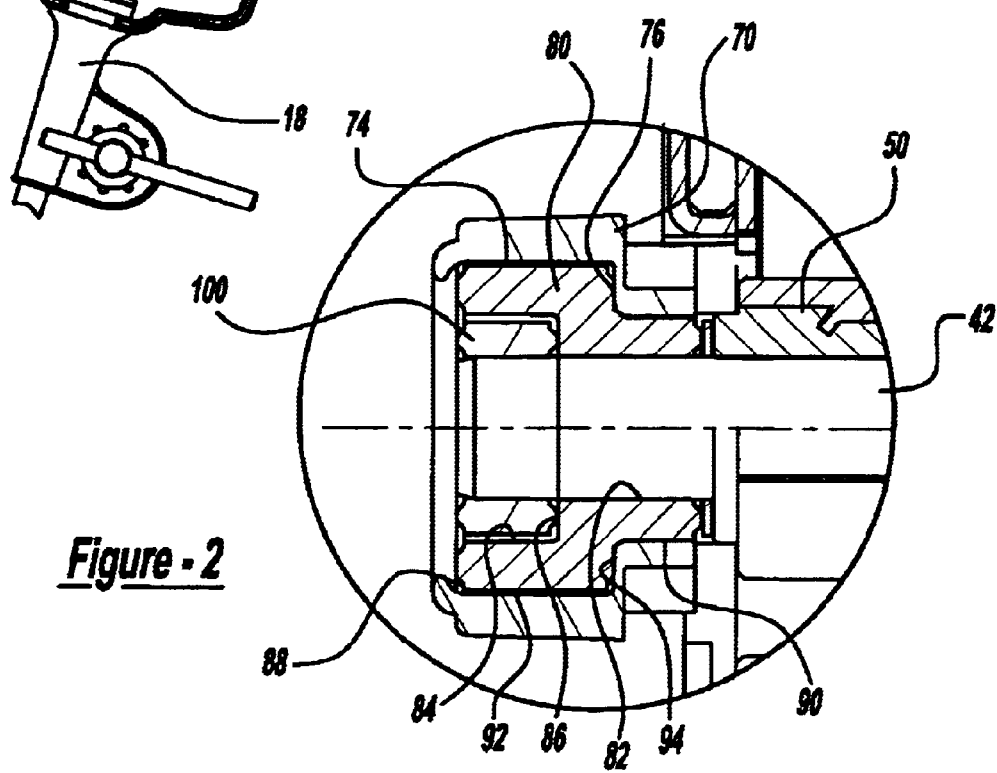
FIG. 2 is a cross-section view of the motor assembly within the Circle

Turning to FIGS. 2 and 3, the motor 14 is better illustrated. The motor 14 includes a stator assembly 30 which includes a housing 32 and magnets 34 and 36. An armature 40 includes a shaft 42, a rotor 44 with plates 46 and windings 48, as well as a commutator 50 coupled onto the shaft 42. The motor also includes end plates 52 and 54. End plate 52 includes a bearing 56 which balances one end of the shaft 56 onto the shaft which is coupled with a power takeoff 58.

The end cap 54 includes brushes 62 and 64 which are associated with the commutator 50. The end cap 54 includes a unitary bearing housing 70. The bearing housing 70 defines an overall cylindrical cavity 74. The cavity includes a stepped shoulder 76. The bearing housing 70 houses a bearing 80.

The bearing 80 has a central bore 82 which is sized to balance the armature shaft 42. The central bore 82 has an enlarged diameter portion 84 at one of its ends. A shoulder 86 is formed at the junction of the two bore portions. The bearing 80 has an outer surface 88 which is defined by a pair of concentric cylinders 90, 92. The cylinders are configured to fit within the bearing housing 70 and have shoulder 94 abut with shoulder 76 of the housing 70.

A retainer 100 is press fit onto the shaft 42. The retainer 100 is an annular member formed from a press metal material including desired lubricant properties. The retainer 100 fits within the enlarged bore portion 84 of the bearing 80. Thus, the retainer 100 and bearing 80 are flush with the end 102 of the shaft 42. The retainer 100 seats on the bearing shoulder 86 to provide registration of the bearing 80. Also, the retainer 100 provides registration for the commutator 50 as well as the rotor 44. By positioning the retainer 100 flush with the end 102 of the shaft 42 and flush with the bearing 80, the commutator 50 as well as the rotor 44 may be easily registered with respect to the shaft 42 and stator assembly 30. Thus, this eases the assembly as well as the placement of these parts within the motor. Also, the retainer 100 minimizes the axial movement of the shaft 42 in the stator 30 due to the enhanced position of the commutator 50 and rotor 44 within the stator assembly 30.

While the above detailed description describes the preferred embodiment of the present invention, the invention is susceptible to modification. variation, and alteration without deviating from the scope and fair meaning of the subjoined claims.

What is claimed is:

1. An armature shaft comprising:

a shaft having two ends;

a commutator on said shaft;

at least one bearing on said shaft, said bearing adjacent one of said ends of said shaft, said bearing having a central bore sized to support said shaft during rotation, said central bore having an enlarged portion opening towards said one end of said shaft, said bearing having an annular portion defining said enlarged portion and said annular portion having a desired depth with a bottom surface; and a retainer on said shaft for retaining said bearing on said shaft, said retainer positioned within said enlarged bore portion of said bearing and said retainer having a desired depth such that one side of said retainer being flush with said one shaft end and another side of said retainer seating on said bottom surface for registering said bearing on said shaft.

2. The armature shaft according to claim 1, wherein housing surrounds said bearing, said housing adapted for fixing with a motor end plate.

3. The armature shaft according to claim 2, wherein said bearing housing having a receiving bore for receiving said bearing, said receiving bore having a stepped configuration.

4. The armature shaft according to claim 3, wherein said bearing has an outer surface with a step configuration for scating with said bearing housing.

5. The armature shaft according to claim 1, wherein said beating and said retainer being flush with said shaft end.

6. The armature shaft according to claim 1, wherein a washer separates said bearing from said commutator.

7. The armature shaft according to claim 1, wherein said enlarged bore portion defines an abutting shoulder, said retainer abutting said shoulder.

8. An electric motor comprising:

stator assembly;

an armature shaft rotatable within said stator assembly;

a commutator rotatable with said armature and connected to said armature via a shaft;

brushes associated with said commutator, said brushes held in an end plate;

at least one bearing on said shaft, said bearing adjacent one of said ends of said shaft, said bearing having a central bore sized to support said shaft during rotation, said central bore having an enlarged portion opening toward said one end of said shaft, said bearing having an annular portion defining said enlarged portion and said annular portion having a desired depth with a bottom surface; and a retainer on said shaft for retaining said bearing on said shaft, said retainer positioned within said enlarged bore portion of said bearing and said retainer having a desired depth such that one side of said retainer being flush with said one shaft end and another side of said retainer seating on said bottom surface for registering said bearing on said shaft; and a bearing at the other end of said shaft.

9. The electric motor according to claim 8, wherein a bearing housing surrounds said bearing, said housing fixed with said end plate.

10. The electric motor according to claim 9, wherein said bearing housing having a receiving bore for receiving said bearing, said receiving bore having a stepped configuration.

11. The electric motor according to claim 10, wherein said bearing has an outer surface with a step configuration for seating with said beating housing.

12. The electric motor according to claim 8, wherein said bearing and said retainer being flush with said shaft end.

13. The electric motor according to claim 8, wherein a washer separates said bearing from said commutator.

14. The electric motor according to claim 8, wherein said enlarged bore portion defines an abutting shoulder, said retainer abutting said shoulder.

15. A power tool comprising:

a housing;

a stator assembly;

an armature rotatable within said stator assembly;

a commutator rotatable with said armature and connected to said armature via a shaft;

brushes associated with said commutator, said brushes held in an end plate;

at least one bearing on said shaft, said bearing adjacent one of said ends of said shaft, said bearing having a central bore sized to support said shaft during rotation, said central bore having an enlarged portion opening toward said one end of said shaft; said bearing having an annular portion defining said enlarged portion and said annular portion having a desired depth with a bottom surface;

a retainer on said shaft for retaining said bearing on said shaft, said retainer positioned within said enlarged bore portion of said bearing and said retainer having a desired depth such that one side of said retainer being flush with said one shaft end and another side of said retainer seating on said bottom surface for registering said bearing on said shaft;

a bearing at the other end of said shaft;

a power source electrically coupled with said motor, an activation member electrically coupled with said motor and said power source for energizing and de-energizing said motor, and an output coupled with said motor for driving a tool.

16. The power tool according to claim 15, wherein a bearing housing surrounds said bearing, said housing fixed with said end plate.

17. The power tool according to claim 16, wherein said bearing housing having a receiving bore for receiving said bearing, said receiving bore having a stepped configuration.

18. The power tool according to claim 17, wherein said bearing has an outer surface with a step configuration for seating with said bearing housing.

19. The power tool according to claim 15, wherein said bearing and said retainer being flush with said shaft end.

20. The power tool according to claim 15, wherein a washer separates said bearing from said commutator.

21. The power tool according to claim 15, wherein said enlarged bore portion defines an abutting shoulder, said retainer abutting said shoulder.

* * * * *

UNITED STATES PATENT AND TRADEMARK OFFICE
CERTIFICATE OF CORRECTION

PATENT NO.   : 6,707,198 B1
DATED        : March 16, 2004
INVENTOR(S)  : Stephen A. Debelius It is certified that error appears in the above-identified patent and that said Letters Patent is hereby corrected as shown below:

Column 3,
Line 59, after "wherein" insert -- a bearing --.
Line 67, "scating" should be -- seating --.

Column 4,
Lines 2 and 41, "beating" should be -- bearing --.
Line 9, before "stator" insert -- a --.

Signed and Sealed this

First Day of February, 2005

JON W. DUDAS
*Director of the United States Patent and Trademark Office*